May 9, 1961 G. PARMEGGIANI 2,983,918
BILATERAL TRANSMISSION SYSTEM
Filed Aug. 19, 1957
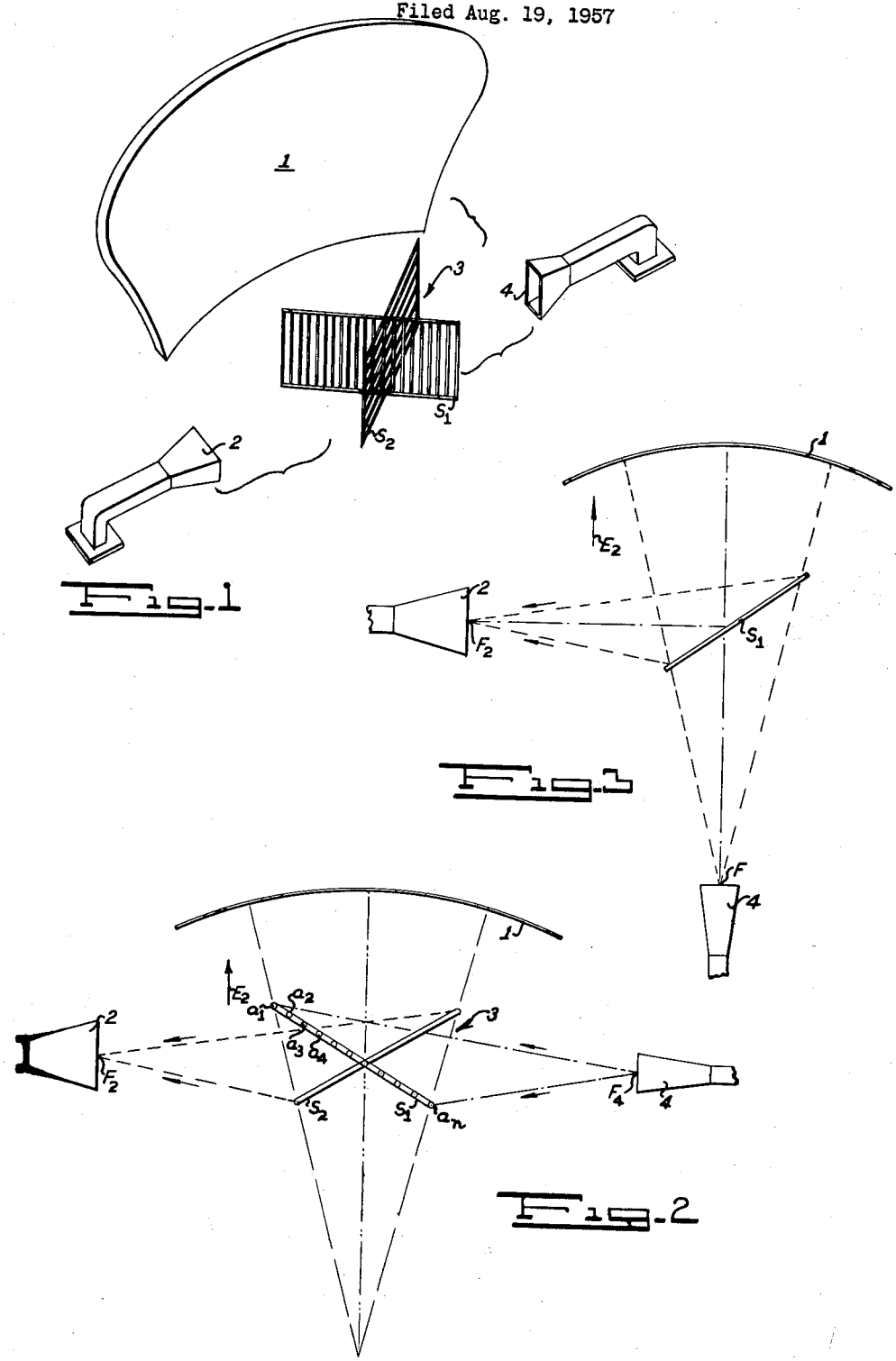

United States Patent Office 2,983,918
Patented May 9, 1961

2,983,918
BILATERAL TRANSMISSION SYSTEM
Gaetano Parmeggiani, Milan, Italy, assignor to Fabbrica Italiana Magneti Marelli S.p.A., Milan, Italy
Filed Aug. 19, 1957, Ser. No. 678,926
Claims priority, application Italy Sept. 11, 1956
10 Claims. (Cl. 343—756)

The invention relates to systems for the bilateral transmission of microwaves.

In my Italian Patent No. 536,052, there is described a system for the transmission of microwaves involving only one decoupling member conveniently coupled with a complex wave guide constituted by two elemental guides disposed at 90° with respect to each other and having one wall in common. According to that system, bilateral transmission is obtained with orthogonal polarization.

The present invention has as an object the provision of an improved installation for bilateral transmission and is characterized in that two wave guide elements are operatively disposed with respect to a single decoupling element and in that the coupling of each wave guide element with the decoupling element is effected by means of a special complex mirror constituted essentially by two elemental mirrors, preferably crossed, and each sensitive only to the polarization of the beam of waves belonging to one wave guide element, while it is decoupled with respect to the beam of waves belonging to the other wave guide element.

The main aspects and characteristics of the present invention will be illustrated with reference to the accompanying drawing wherein:

Fig. 1 is a diagrammatic perspective view of an installation provided in accordance with the invention;

Fig. 2 is a top view of the same arrangement illustrating the transmission system; and Fig. 3 illustrates a variation.

With reference to Figures 1 and 2, element 1 is the single decoupling member of the system and is constituted preferably by a member with a parabolic surface portion; and elements 2 and 4 are two wave guide elements or horns placed at spaced points. Element 3 is a complex mirror constituted by two elemental mirrors S1 and S2 operatively associated with each other.

The wave guide elements 2 and 4, terminated for instance in the shape of a frustum of rectangular pyramid, are respectively connected to the receiving apparatus and to the transmitting apparatus of a transmitting installation. The complex mirror 3 constitutes for horns 2 and 4 the means for coupling with the reflector 1.

Each elemental mirror S1 and S2 comprises essentially an assembly of parallel elements for instance tubular or metallic rods arranged in a single plane. These rods are fixed at a convenient distance from one another by a frame whereto they are fixed. The distances between the various elements as well as the dimensions thereof depend on the frequency of transmission.

The two simple mirrors S1 and S2, which in Figures 1 and 2 are crossed with each other form the complex mirror for illuminating the parabolic reflector 1 of which F is the focus. It is known that a parabolic reflector should be exposed to a spherical wave with a center of phase at the focus of said reflector. Usually the primary source of radiation is a horn or funnel type radiator radiating a spherical beam the center of which is at the center of the aperture of the flare or horn.

If there is only a single decoupling member and the installation for transmission is bilateral (that is, a transceiver installation or serves for the contemporaneous transmission or reception of two radio beams to be separated by polarization), the condition of coincidence of the centers of the two radiating apertures with the focus of the reflector is not strictly met and error may be the consequence. According to the invention, in a bilateral or any multiple transmission system, for microwaves in particular, the adoption of the complex mirror associated with the two wave guide elements fully solves the problem and insures excellent efficiency of transmission.

With particular reference to Fig. 2, is indicated the function of mirrors S2 and S1 placed between the reflector and focus F. More particularly, these mirrors create the focuses F2 and F4, respectively, at each of which there is placed easily and with well-known advantages the center of phase of a primary radiator. With this system, as is obvious, the real focus F of the reflector 1 is divided into two virtual foci.

The plane mirror S2 assumed for instance to be coupled with the receiving apparatus of the system converges at the virtual focus F2 the rays that the reflector 1 would otherwise make converge in F. Another focus may be created by the same system, by employing the mirror S1 to which there corresponds the focus F4. At F2 and F4 there are placed the primary radiators with the phase center coinciding with these points. The term primary radiators is used by way of example, but it should be understood that one of the horns or both may serve for reception.

In order that the mirror S1 coupled with the flare 4 should not disturb the beam of wave belonging to the flare 2, it is necessary that the beam reflected by the mirror S1 should be polarized orthogonally to the waves of horn 2.

For instance, flare 4 will radiate a field with vertical polarization and the flare 2 a field with horizontal polarization.

Hence the mirror S1 will be arranged in such a way as to reflect or radiate the beam of the horn 4 without influencing the beam belonging to the horn 2. For the mirror S1 this condition is fully met if its elementary conductors indicated in Fig. 2 by the traces $a1$, $a2$, ... $an$, are orthogonal to the direction of the electric field of the horn 2; that is, if the direction of this field is the one indicated by the arrow E2. This is also valid for the mirror S2 and conductors will have to be orthogonal to the field radiated by the horn 4.

By the system of transmission according to the present invention, for each of the polarizations there is obtained the same coefficient of illumination that would be obtained if the reflector were irradiated by a radiator placed at the focus F with the advantage of utilizing the same reflector for both polarizations. Also the decoupling between the two signals of different polarization is very efficient.

An alternative of this system consists as shown in Fig. 3 of placing one horn in the virtual focus F2 or F4 and the other one in the real focus F. The complex mirror is in a position intermediate the true focus and the parabola and will have both elementary mirrors S1 and S2 if the respective flares will appear to be placed in the foci F2 and F4, while it will have only one single elemental mirror if one horn is placed in the real focus of the reflector.

What is claimed is:

1. Apparatus for the transmission and reception of electromagnetic energy comprising, a reflector element having a given focal point, a first polarized reflector for reflecting vertically polarized energy positioned between said reflector element and said focal point thereof, a second polarized reflector for reflecting horizontally polarized energy angularly disposed relative to said first polarized reflector and positioned between said reflector element and said focal point thereof, first means operative with vertically polarized electromagnetic energy associated with said first polarized reflector, and second means operative with horizontally polarized electromagnetic energy associated with said second polarized reflector in the same direction as said vertically polarized energy, whereby said first and second means are electromagnetically decoupled from each other and electromagnetically coupled to said reflector element for the reception of or transmission of electromagnetic energy.

2. Apparatus in accordance with claim 1 in which said first polarized reflector comprises a plurality of rods disposed in a first plane and the second polarized reflector comprises a plurality of rods disposed in a second plane which is angularly disposed relative to said first plane, said rods in said first plane being azimuthally turned relative to the rods in said second plane, so that said rods in said first plane will reflect vertically polarized energy and said rods in said second plane will reflect horizontally polarized energy.

3. Apparatus in accordance with claim 2 in which said reflector element is a paraboloidal reflector and said first and second means each comprise a wave guide provided with a horn radiator, said horn radiator having a frusto-pyramidal shape, the larger base of said horn radiator being positioned at the focal point of said paraboloidal reflector as shifted by its associated polarized reflector.

4. Apparatus in accordance with claim 1 in which said first polarizing reflector is disposed at an angle less than 90° to any line passing through said reflector element and said focal point thereof to provide a focal point for the system defined by said reflector element and said first polarizing element which is outside of the area defined by any pair of lines of incidence to said reflector element alone, said first means being positioned at said focal point of said system whereby no interference is provided by said first means to any line of incidence or reflection on said reflector element.

5 Apparatus in accordance with claim 4 in which said second means is positioned at said focal point of said reflector element.

6. Apparatus in accordance with claim 4 in which said second polarizing reflector shifts the focal point of the system comprising said reflector element and said second polarizing element to a point outside a line of incidence passing through the focal point of said reflector element, and said second means being positioned at the focal point of said system.

7. A system for transmitting and receiving microwave energy comprising a paraboloidal reflector, a first plane reflector having a plurality of horizontal conductors and a second plane reflector having a plurality of vertical conductors, disposed substantially at 90 degrees with respect to said horizontal conductors, said conductors facing and being positioned between the focal point and reflecting surface of said paraboloidal reflector, first means located outside of a line of incidence of said paraboloidal reflector passing through the focal point thereof and arranged to receive or transmit microwave energy transmitted or received, respectively, from one of said plane reflectors and second means arranged to radiate or receive microwave energy in the same direction as said first means.

8. The system in accordance with claim 7 in which said second means is located outside of said line of incidence and is arranged to receive or transmit microwave energy transmitted or received, respectively, from the other of said plane reflectors.

9. The system in accordance with claim 7 in which said second means is located outside of said line of incidence and is arranged to transmit or receive microwave energy solely of one polarization from said other plane reflector.

10. Apparatus for the transmission and reception of electromagnetic energy comprising, a paraboloidal reflector element having a given focal point, a first polarized reflector for reflecting vertically polarized energy positioned between said reflector element and said focal point thereof, a second polarized reflector for reflecting horizontally polarized energy angularly disposed relative to said first polarized reflector and positioned between said reflector element and said focal point thereof, first means responsive to and capable of receiving or transmitting vertically polarized energy associated with said first polarized reflector, and second means responsive to and capable of receiving or transmitting horizontally polarized energy associated with said second polarized reflector in the same direction as said vertically polarized energy, whereby said first and second means are electromagnetically decoupled from each other and electromagnetically coupled to said reflector element for the reception of or transmission of electromagnetic energy, said first and second means each comprising a wave guide provided with a horn radiator, said horn radiator having a frusto-pyramidal shape, the larger base of said horn radiator being positioned at the focal point of said paraboloidal reflector as shifted by its associated polarized reflector.

References Cited in the file of this patent

UNITED STATES PATENTS

| | | |
|---|---|---|
| 1,938,066 | Darbord | Dec. 5, 1933 |
| 2,042,302 | Frantz | May 26, 1936 |
| 2,441,574 | Jaynes | May 18, 1948 |

FOREIGN PATENTS

| | | |
|---|---|---|
| 743,533 | Great Britain | Jan. 18, 1956 |
| 1,098,286 | France | July 21, 1955 |

OTHER REFERENCES

Aerials for Centimeter Wavelengths by Fry et al., 1950, page 74.